United States Patent [19]

Cole

[11] 4,019,019
[45] Apr. 19, 1977

[54] METHOD OF PRODUCING TUBE RODS AND ARTICLES PRODUCED THEREFROM

[75] Inventor: James Arlen Cole, El Monte, Calif.

[73] Assignee: Cabot Corporation, Kokomo, Ind.

[22] Filed: Mar. 20, 1975

[21] Appl. No.: 560,305

[52] U.S. Cl. .................................. 219/146; 427/61
[51] Int. Cl.² ........................................ B23K 35/36
[58] Field of Search ................ 219/137, 145, 146; 427/59, 60, 61

[56] References Cited

UNITED STATES PATENTS

| | | | |
|---|---|---|---|
| 2,452,493 | 10/1948 | Rollason et al. ................. | 427/59 X |
| 3,559,864 | 2/1971 | Hillert ............................. | 427/59 X |
| 3,592,999 | 7/1971 | Quaas ............................... | 219/146 |
| 3,783,234 | 1/1974 | Russell ............................. | 219/146 |
| 3,894,211 | 7/1975 | Young et al. ..................... | 219/146 |

*Primary Examiner*—Bruce A. Reynolds
*Assistant Examiner*—N. D. Herkamp
*Attorney, Agent, or Firm*—Buell, Blenko & Ziesenheim

[57] ABSTRACT

In the manufacture of hollow weld rods filled with particulate solids such as carbides, the rod ends are sealed with a solid material which has entered into the rod ends between the particles of filler and solidified into a film covering the rod end and filling the interstices of the filler material adjacent the end.

8 Claims, No Drawings

METHOD OF PRODUCING TUBE RODS AND ARTICLES PRODUCED THEREFROM

This invention relates to filled tube rods and, more specifically, to bare tube rods filled with particulate materials that may be used in hard-facing processes.

Processes for producing filled tube rods are well known in the art and typically disclosed in U.S. Pat. Nos. 1,629,748, 1,671,384, 1,757,601 and 3,534,390.

It is known in the present art, that the tube may be composed of any suitable material as may be required depending upon the desired final hard-facing deposition. The tube may be composed principally of iron, nickel, cobalt, copper or their alloys. Also the particulated filler mixtures including hard particles, such as tungsten carbide, and other filler materials such as flux may be composed of any suitable materials as may be required. Various combinations of tube composition and filler materials are known in the art and are typically disclosed in U.S. Pat. Nos. 2,700,091, 2,611,710 and 3,534,390.

In view of the discussion above, the practice of the instant invention clearly is applicable to bare filled tube rods regardless of the composition of the tube or filler mixture ingredients.

Present method of sealing the ends of the filled tube rods consists of arc welding the ends. The welded tip, because of the extremely high temperature of the arc usually contains a highly oxidized surface. Such oxidized surface at the tip of tube rod is detrimental to obtaining a good starting weld when the tube rod is used in hard-facing operations. Furthermore, the arcing step often overheats the tube end to the extent there is melting and dissolution of the tungsten carbide particles near the ends of the tube rod. To avoid depositing such altered composition of the overheated tip, in many instances the hard-facing operator melts off and discards the first inch, more or less, of the welded tube rod. Then he starts a new weld to proceed with the hard-facing operations. Thus, to obtain optimum results and avoid possible poor deposition, the hard-facing operators (1) start the weld, (2) stop, (3) melt off end, (4) restart the weld and (5) begin deposition. The elimination of the arcing step to seal the ends, will permit the operator (1) to start the weld and (2) begin deposition.

It is a principal object of this invention to provide a more economical method for sealing the ends of filled tube rods.

It is another principal object of this invention to provide filled tube rods at lower costs with no reduction in quality of product.

It is another object of this invention to provide a method for sealing ends of filled tube rods without arc welding, thereby conserving energy.

It is still another object of this invention to provide a filled tube rod that is deposited more simply and without waste of costly materials.

Other aims and objectives will be apparent to those skilled in the art by the following specification and claims.

EXAMPLE I

A quantity of bare filled tube rods were produced and the ends of the rods were pinched to a smaller diameter by methods well known in the art as described earlier herein.

The following is a brief description of the actual process used to dip-seal the ends of tubular rods.

A portion (200 pounds) of a production run of 3/16 inch diameter by 6 feet length "Haynes" 94G Modified rods, produced in the standard manner, were dip-sealed by the following procedure.

A solution of sodium silicate, N brand manufactured by Philadelphia Quartz Company was prepared by adding approximately one percent by weight of C.P. Ultramarine Blue Cobalt shade 458-B powder manufactured by Frank D. Davis Company. This produced a blue colored solution which was poured into a flat shallow pan to a depth of about ¼ inch. The blue coloring may be added for two reasons:

1. To provide an easier method of inspection for complete sealing of the tubular rod ends; and 2. To adjust the viscosity or thickness of the solution.

Approximately the first 50 pounds was dipped by grasping about 40 rods at a time, dipping one end into the solution, inverting the rods, and dipping the other end into the solution. The rods were then placed on a baking stand, inspected, and allowed to dry at ambient temperature. Using this process proved to be unsuccessful due to the solution running down the first end of the rod when the rods were inverted to dip the second end.

The method devised to successfully dip-seal the rods was to dip-seal one end in the same manner as described previously and then place the rods on a baking stand, let dry for a period of one hour until the seal has become sufficiently viscous to prevent flowing, dip-seal the second end, inspect, and place on a baking stand. The balance of the 200 pounds were dip-sealed in this manner.

The rods were placed in an oven and baked for 4 hours at 480° F. This bake produced a dry, resilient, adhesive film on the ends of the rods which prevented the granular filler material from leaking from the ends of the rods.

This process reduces the direct cost of the sealing process as shown in the table, using 1.0 as the cost of arc-sealing the rods.

TABLE I

| | ARC-SEALING | DIP-SEALING |
|---|---|---|
| RELATIVE COST | $1.00 | 0.13 |

Examination of the tube rods of this invention reveals that optimum sealing is effected not merely by a capping of the sealant over the opening as an external coating but also by a capillary action of the sealant that effectively enters and fills the internal passages among the filler material at the tube end. Thus it is preferred that the sealant of this invention should be viscous and yet fluid enough to rise by capillary action for best results. These combined characteristics continue to provide an effective sealant in the event that the external seal coating is accidentally removed due to rough handling of the tube rod.

Sealants that may be used in the process of this invention typically include the following:

Silicates, e.g. sodium, ethyl, potassium silicates under commercial names "RU" "Q" "N" "K" and the like;

Glues, e.g. caseins, collagenous and sucrose adhesives;

Plastics, e.g. resins, phenolics and the like; and

Tars, e.g. organic, petroleum.

The important factor to consider in using any of the foregoing materials is that they have sufficient fluidity to permit at least some capillary action within the filler material adjacent the end of the filled rod and yet be capable of setting up relatively rapidly either by reason of oxidation, polymerization or drying so as to form a solid film over the tube end and within the interstices of the filler material.

In the foregoing specification I have set out certain presently preferred embodiments and practices of my invention, however, it will be understood that this invention may be otherwise embodied within the scope of the following claims.

I claim:

1. The method of closing the ends of hollow weld rods filled with particulate solids comprising the steps of mechanically reducing the diameter of the hollow rod ends to restrain the solids from falling out the end while leaving an opening into the interior, dipping one end in a fluid material having sufficient capillarity to enter between the particles of filler within the hollow tube adjacent each end and solidify to form a film over the tube end and within the particulate solids filler adjacent the end, permitting said fluid material to become sufficiently viscous to retain its position within the particulate solids prior to dipping the other end, dipping the other end of said weld rod in said fluid material and solidifying the fluid material in both ends.

2. The method as claimed in claim 1 wherein the fluid material is a silicate.

3. The method as claimed in claim 1 wherein the fluid material is a solution of sodium silicate.

4. The method as claimed in claim 1 wherein the fluid material is a liquid silicate.

5. A filled weld tube made by the method of claim 1.

6. The method as claimed in claim 1 wherein the fluid material is a liquid glue.

7. The method as claimed in claim 1 wherein the fluid material is a liquid plastic.

8. The method as claimed in claim 1 wherein the fluid material is a liquid tar.

* * * * *